(12) United States Patent
Criscione, II et al.

(10) Patent No.: US 8,858,306 B2
(45) Date of Patent: Oct. 14, 2014

(54) BIRD CAVITY WASHER

(71) Applicants: Johnson Food Equipment, Inc., Kansas City, KS (US); Baader Linco, Inc., Kansas City, KS (US)

(72) Inventors: Frank J. Criscione, II, Kansas City, MO (US); Oliver Hahn, Parkville, MO (US); Ronnie Lee Avey, Gladstone, MO (US)

(73) Assignee: Baader Linco, Inc., Kansas City, KS (US)

( * ) Notice: Subject to any disclaimer, the term of this patent is extended or adjusted under 35 U.S.C. 154(b) by 57 days.

(21) Appl. No.: 13/629,002

(22) Filed: Sep. 27, 2012

(65) Prior Publication Data

US 2013/0078899 A1    Mar. 28, 2013

Related U.S. Application Data

(60) Provisional application No. 61/539,812, filed on Sep. 27, 2011.

(51) Int. Cl.
*A22C 25/02* (2006.01)
*A22B 5/00* (2006.01)
*A22C 21/00* (2006.01)

(52) U.S. Cl.
CPC ........... *A22B 5/0082* (2013.01); *A22C 21/0061* (2013.01)
USPC ........................................................ 452/173

(58) Field of Classification Search
CPC .... A22C 21/06; A22C 21/0061; A22C 13/02; A22C 21/0023; A22C 21/00; A22C 29/04; A22C 29/043; A22C 29/046; A22C 11/125; A22C 17/16; A22C 25/17; A22C 11/029; A22C 13/0013; A22C 17/004
USPC ............. 452/74–77, 81, 91–93, 99, 119, 173, 452/123, 116–118

See application file for complete search history.

(56) References Cited

U.S. PATENT DOCUMENTS

| | | | | |
|---|---|---|---|---|
| 4,788,749 A * | 12/1988 | Hazenbroek et al. | ......... | 452/119 |
| 4,876,767 A | 10/1989 | Harben | | |
| 5,041,054 A | 8/1991 | Nieuwelaar | | |
| 6,146,263 A * | 11/2000 | Mostoller et al. | ............. | 452/173 |
| 6,176,772 B1 * | 1/2001 | Hazenbroek et al. | ......... | 452/117 |

(Continued)

OTHER PUBLICATIONS

Baader 1498 Bird Cleaning System flyer; Feb. 11, 2010; Baader Johnson Food Processing Machinery, Kansas City, Kansas.

*Primary Examiner* — Richard Price, Jr.
(74) *Attorney, Agent, or Firm* — Spencer Fane Britt & Browne LLP

(57) ABSTRACT

A probe for cleaning the eviscerated body cavity of an animal, including a bird, has a washer assembly rotatably mounted about a tube. The washer assembly includes a nose having apertures extending between the interior and exterior of the nose. A bore within the tube feeds fluid to the apertures in the nose. As the probe is inserted into and withdrawn from the body cavity the nose rotates and fluid washes the body cavity. Alternatively, the probe includes a helical auger mounted about the tube that rotates as the probe moves into and out of the body cavity to assist in agitating the fluid within the body cavity and to displace the leaf fat. The nose may seal the anterior opening of the bird carcass to allow the body cavity to fill with fluid and the auger to agitate the accumulated fluid.

15 Claims, 6 Drawing Sheets

(56) References Cited

U.S. PATENT DOCUMENTS

| | | | |
|---|---|---|---|
| 6,213,864 B1 * | 4/2001 | Griffiths et al. | 452/173 |
| 6,220,952 B1 * | 4/2001 | Taylor et al. | 452/173 |
| 6,887,145 B2 | 5/2005 | Howe | |
| 7,537,515 B2 * | 5/2009 | Chattin et al. | 452/119 |
| 7,918,717 B2 * | 4/2011 | Chattin et al. | 452/123 |
| 8,641,486 B1 * | 2/2014 | Clarke et al. | 452/122 |

* cited by examiner

BIRD CAVITY WASHER

CROSS-REFERENCE TO RELATED APPLICATIONS

This application claims priority in U.S. Provisional Patent Application No. 61/539,812, filed Sep. 27, 2011, the contents of which are hereby incorporated herein by reference in their entirety.

BACKGROUND

The present disclosed subject matter relates generally to a cleaning device, and in particular an apparatus inserted into the eviscerated body cavity of an animal carcass for washing the body cavity and removing debris therefrom.

The automated processing of animal carcasses, including poultry, involves the removal of the head and neck portion of the animal, and evisceration of the body cavity. The resulting carcass consists of a body cavity with the thorax having an anterior opening, and the abdomen having a posterior opening. The eviscerated carcass then moves through the automated processing operation suspended from a shackle connected to a conveyor system.

A subsequent step in the processing operation is the cleaning of the interior of the body cavity to remove tissue debris and contaminates generated by the evisceration process. Fluid, such as water or a cleaning fluid, is introduced into the body cavity to dislodge the tissue debris and contaminates. The tissue debris and contaminants become suspended by the fluid and are washed from the body cavity as the mixture drains from the anterior and posterior openings. Currently available devices spray fluid into the body cavity that immediately drains from the carcass through the openings without harnessing any benefits from an accumulation of the fluid.

Heretofore there has not been available a bird cavity washer with the advantages and features of the disclosed subject matter.

SUMMARY

A bird cavity washer having a rotating tubular auger expels liquid from a tubular nose as it enters and exits the body cavity of an eviscerated bird for cleaning the interior of the body cavity. The nose and auger are rotatably mounted about a metal tube and are operatively connected to a tubular sleeve above. The bird cavity washer is operably connected to a rotary carousel cleaning unit having a fixed toothed gear that interacts with cooperating ridges and notches in the sleeve causing the sleeve, auger, and nose to rotate.

The auger includes a helical blade that agitates the fluid that accumulates within the body cavity, and displaces the leaf fat. The probe enters a posterior opening in the carcass and the nose seals an opposite anterior opening in the carcass allowing the fluid to accumulate within the body cavity and the auger to agitate the fluid within the body cavity to enhance removal of tissue debris and contaminants. Withdrawing the probe allows the accumulated fluid to drain from the body cavity through the anterior opening and for the auger to displace the leaf fat allowing the liquid expelled from the nose to wash the area between the leaf fat and body cavity.

BRIEF DESCRIPTION OF THE DRAWINGS

The drawings constitute a part of this specification and include exemplary embodiments of the disclosed subject matter, and illustrate various objects and features thereof.

DETAILED DESCRIPTION

Figure 1:
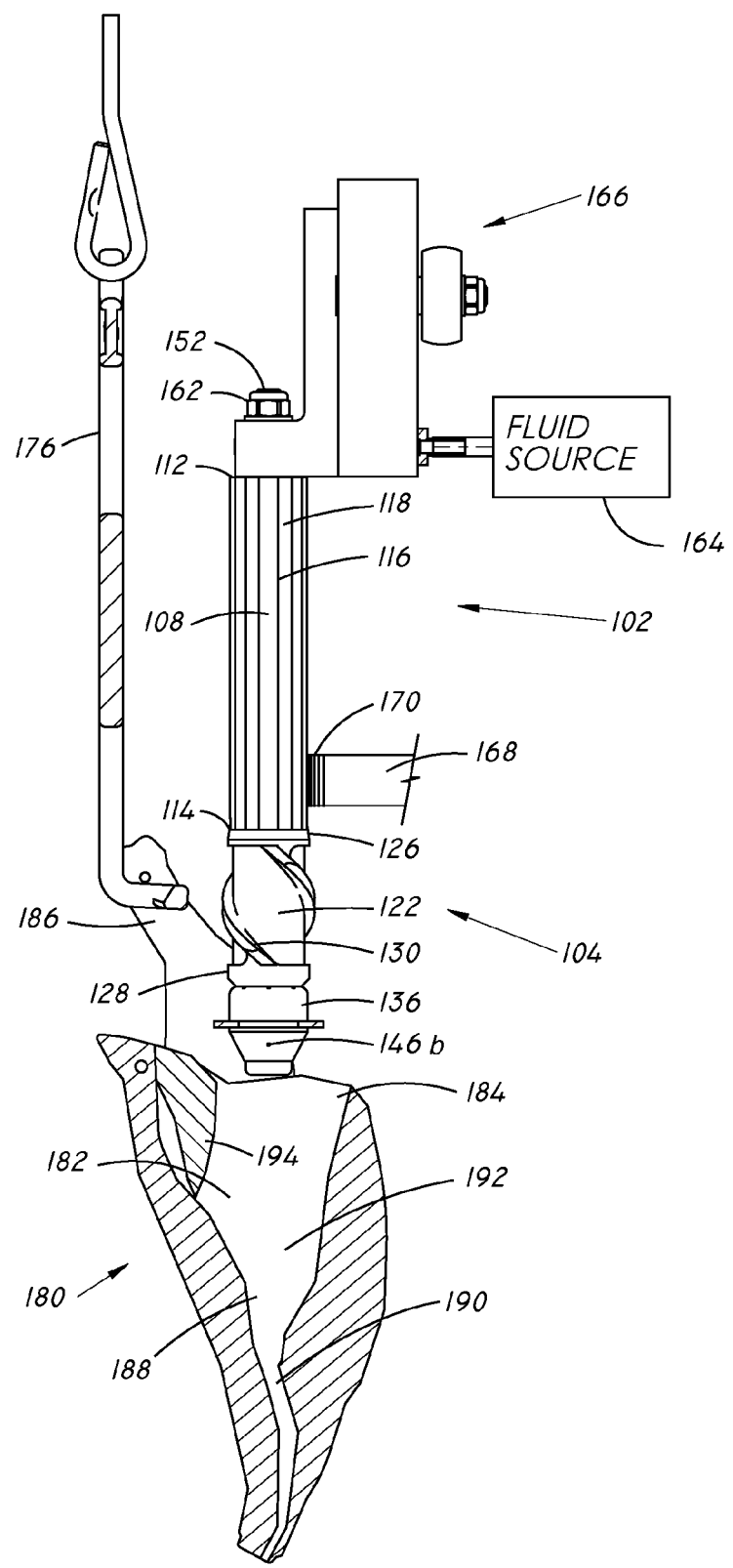
FIG. 1 is an elevation view of the bird cavity washer being inserted into the body cavity of a bird shown in section.

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Referring to the drawings, FIGS. 1-6 generally show an embodiment of a bird cavity washer 102 embodying principles of the disclosed subject matter. The bird cavity washer 102 comprises a probe 104 connected to a mount 166. The mount 166 is connected to a cleaning unit (not shown) that inserts the probe 104 into the body cavity 192 of a bird carcass 180 as it passes through the cleaning unit.

Figure 4:
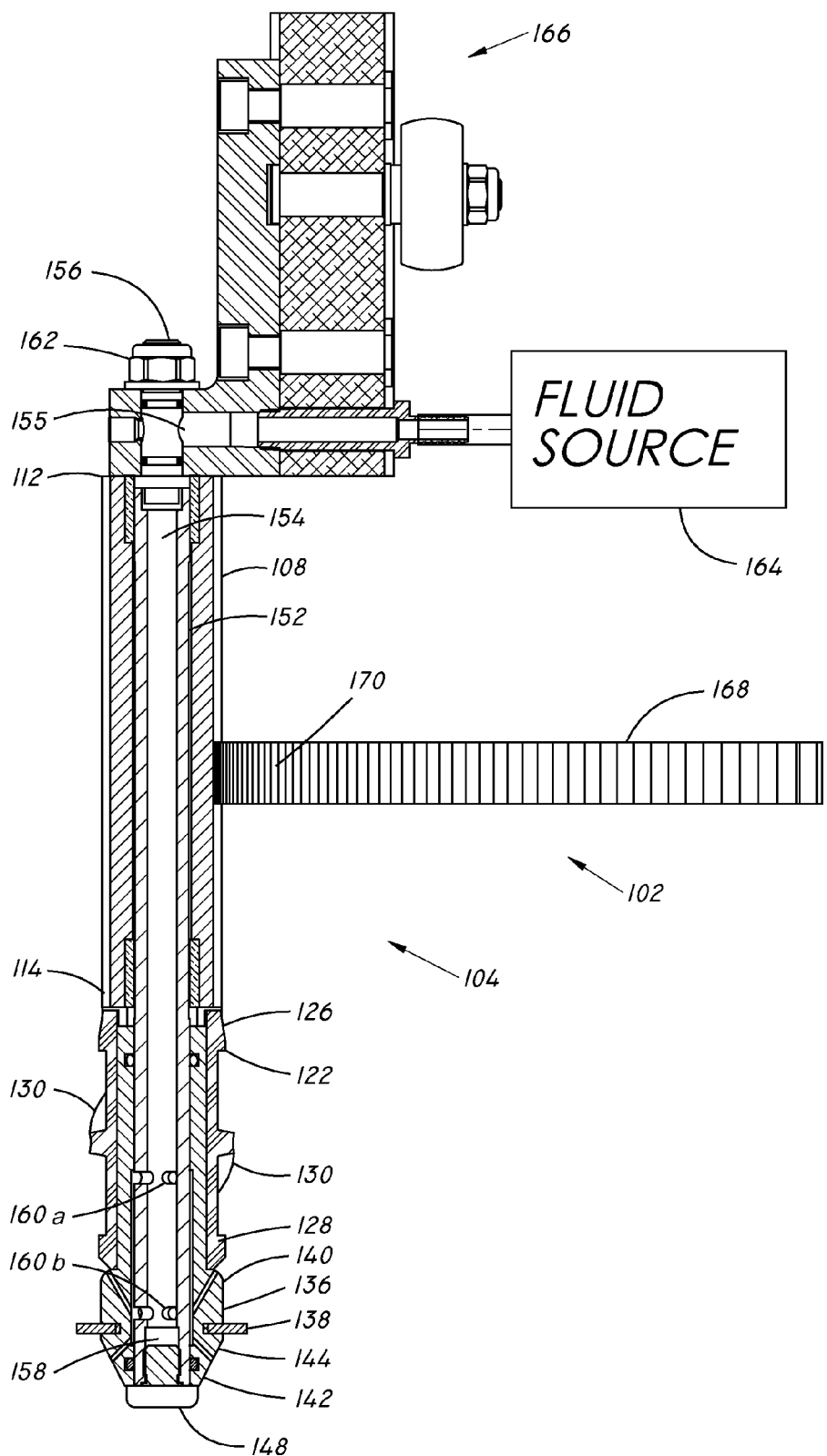
FIG. 4 is a sectional view of the bird cavity washer.
Figure 5:
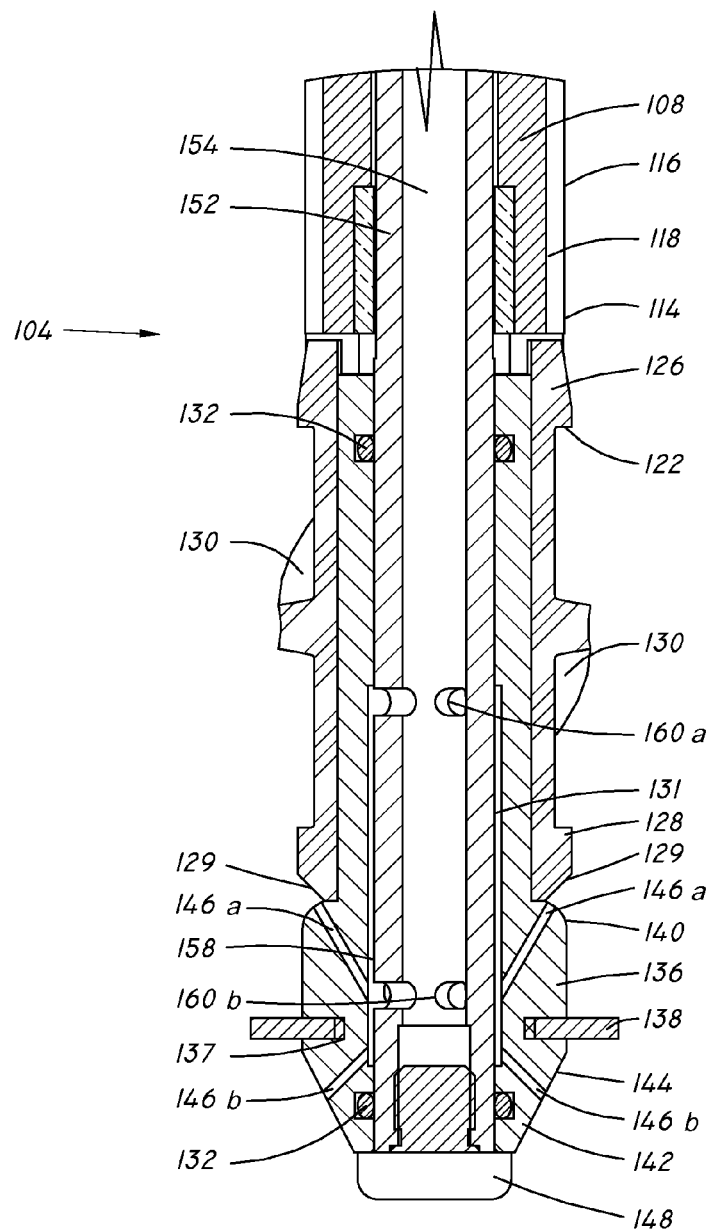
FIG. 5 is an enlarged sectional view of the bird cavity washer in FIG. 4.
Figure 6:
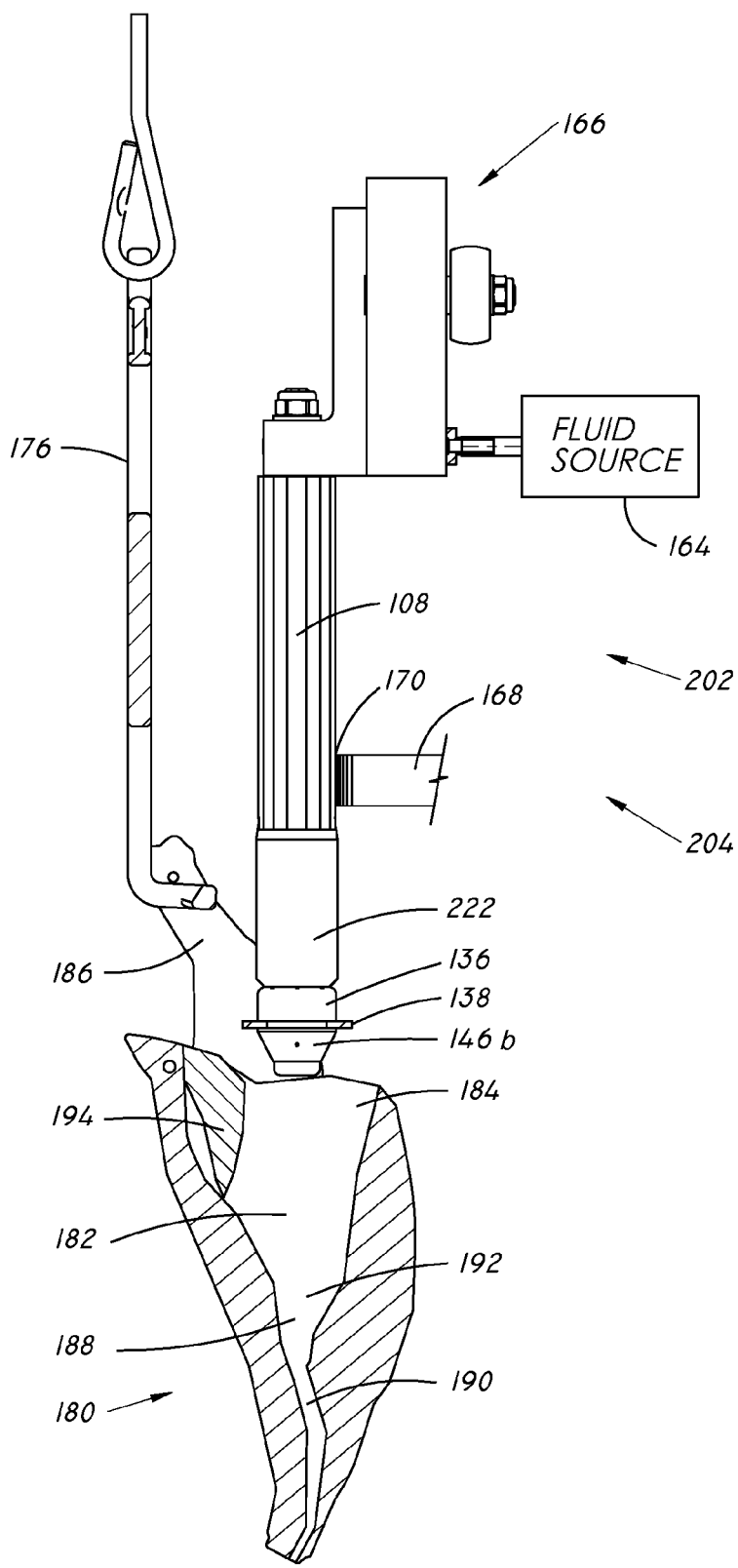
FIG. 6 is an elevation view of an alternative embodiment bird cavity washer being inserted into the body cavity of a bird cavity shown in section.

Turning to FIGS. 1 and 4, the probe 104 is generally an elongated tubular apparatus depending from the mount 166. The probe 104 includes a washer assembly for cleaning the interior of a bird carcass 180. The washer assembly is rotated by a rotational energy source. The washer assembly comprises a tubular auger 122 member rotatably mounted on a tube 152 above a nose 136 member. The tube 152 has an axial bore 154 extending between an upper end 156 and lower end 158. Ports 155 at the upper end 156 communicate with a fluid source 164 for providing fluid to the nose 136. A first port 160a and a second port 160b at the lower end 158 communicate with the apertures 146a and 146b in the nose 136 for discharging fluid from the probe 104 into the body cavity 192 of a bird carcass 180.

The auger 122 has a tubular body extending between an upper end 126 and a lower end 128. A helical blade 130 projects from the exterior surface of the body and extends between the lower end 128 and the upper end 126. The blade 130 engages and agitates the fluid within the body cavity 192, and displaces the leaf fat 194, both of which are discussed more fully below.

The tubular nose 136 is operably connected to the auger 122, and has an upper portion and a lower portion having a sidewall 144. The lower portion tapers from a wide upper end 140 to a narrow lower end 142 and is dimensioned to fit in the anterior opening 190 of a bird carcass 180. A resilient ring 138 is mounted on the nose 136 within an outwardly open circumferential channel 137 and extends outward from the channel 137 for scouring the walls of the body cavity 192. A plurality of apertures 146a and 146b extend between the tube 152 and the exterior of the nose 136 in a spaced, radial pattern for expelling fluid from the tube 152 into the body cavity 192. Fluid is expelled through the lower aperture 146b downward and away from the nose 136, and the upper aperture 146a upward from the nose 136 proximal to the upper end 140. Liquid expelled from aperture 146a contacts a lower face 129 of the auger 122 to deflect fluid upward and outward away from the probe 104. A tubular neck extends upward from the upper end 140 of the nose 136 and is disposed between the tube 152 and the auger 122. An O-ring 132 disposed within an inwardly open annular groove is located above the upper port 155, and in the nose 136 below the lower port 160 contains fluid outside the tube 152 within a cavity 131 formed within the inner surface of the nose prior to being expelled through the apertures 146a and 146b.

A sleeve 108 member has a tubular body extending between an upper end 112 and a lower end 114, and is operably connected to the upper end 126 of the auger 122 and the upper portion of the nose 136 using an alternating slot and tooth arrangement there between. A rotational energy source provides mechanical rotational energy to the washer assembly by acting on the sleeve 108. This embodiment of the probe 104 is provided rotational energy by a gear 168 fixed to a rotary carousel cleaning unit. The probe 104 sleeve 108 has a plurality of ridges 116 projecting from the exterior surface of the sleeve 108, and extends between the upper end 112 and the lower end 114 forming elongated notches 118 that engage teeth 170 on the gear 168. As the probe 104 travels around the carousel against the fixed circular gear 168, the sleeve 108 rotates about the tube 152, and the auger 122 and nose 136 rotate about the tube 152. A bushing disposed within a notch within the interior lower end 114 of the sleeve 108 resides between the sleeve 108 and the tube 152 providing a sealing relationship. A fastener, such as a screw 148, is threadably received within the lower end 158 of the tube 152 for retaining the nose 136, auger 122, and sleeve 108 on the tube 152. Alternatively, the fastener may be secured within the lower end 158 by an interference fit.

A fastener, including a nut 162 is threadably received on the upper end 156 of the tube 152 for securing the probe 104 to the mount 166. The tube 152 may be manufactured from metal, preferably stainless steel. The nose 136, auger 122, and sleeve 108 may be manufactured from a resilient material including high-density polyethylene (HDPE).

Referring to FIG. 1, the bird carcass 180 is suspended by its legs 186 from a shackle 176 below the bird cavity washer 102. The ring 138 rotates with the nose 136 scouring the walls of the body cavity 192 from above. As the auger 122 rotates and fluid sprays from the apertures 146 as the probe 104 descends toward the bird carcass 180. When viewed from above, the auger 122 is shown with blades 130 spiraling clockwise from the lower end 128 toward the upper end 126 along the body 124. As such, the auger 122 is rotated counter-clockwise when in use to move fluid from the lower end of the probe 104 to the upper end of the probe 104. Alternatively, the blade 130 may spiral counter-clockwise from the lower end 128 toward the upper end 126. Thus, the auger 122 would be rotated clockwise when in use to move fluid in the body cavity 192. As the nose 136 passes through the posterior opening 184 past the leaf fat 194 and into the abdomen 182, the fluid washes the interior of the body cavity 192 and exits below through the anterior opening 190. As the probe 104 advances downward through the abdomen 182 into the thorax 188, fluid continues to flow from the nose 136 washing the interior of the thorax 188.

Figure 2:
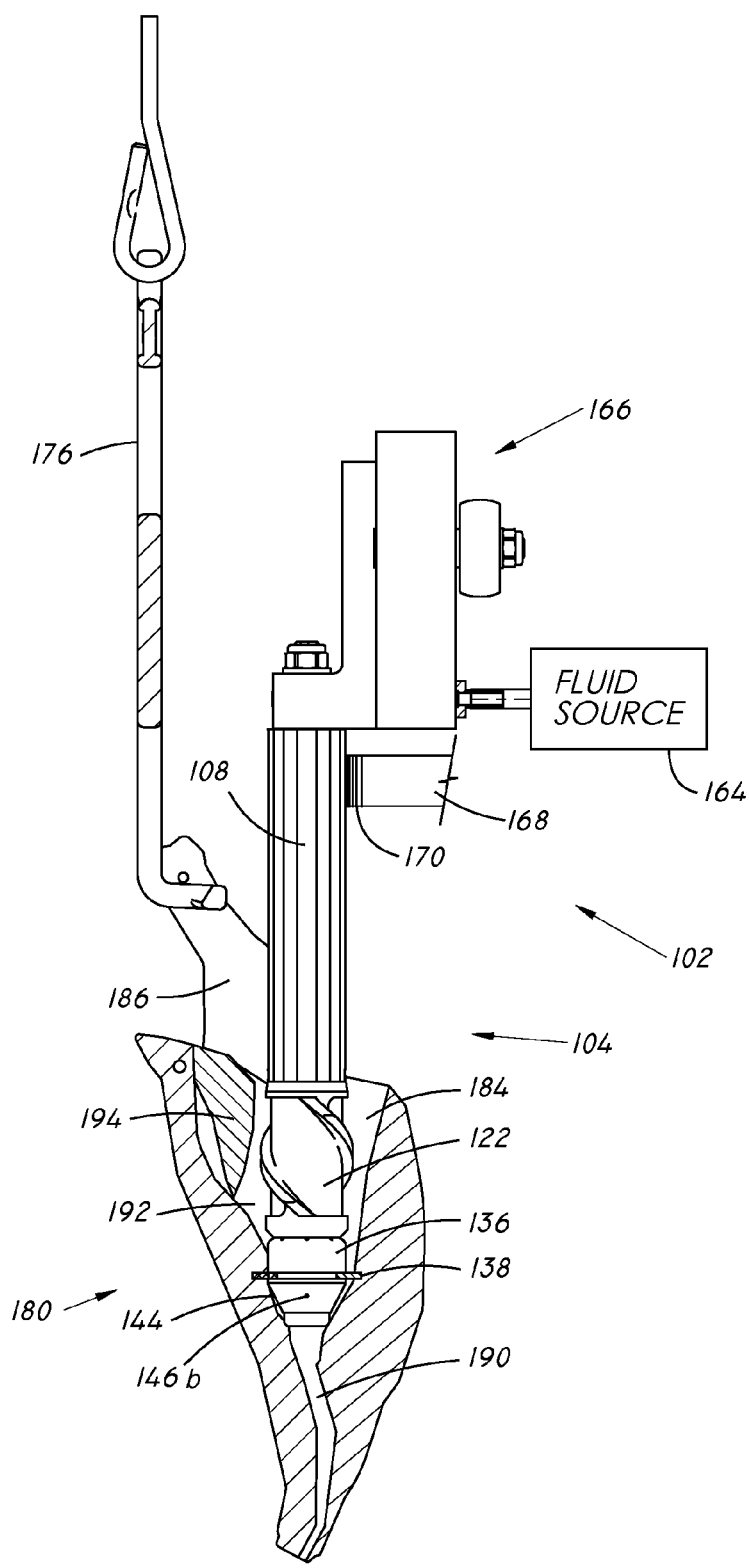
FIG. 2 is an elevation view of the bird cavity washer fully inserted into the body cavity of a bird and sealing the anterior opening.

Referring to FIG. 2, as the nose 136 reaches the anterior opening 190, the sidewall 144 makes contact with the anterior opening 190 creating a sealing relationship between the nose 136 and the body cavity 192. This orientates the bird carcass 180 whereby the probe 104 is able to access the body cavity 192. With the nose 136 remaining in contact with the anterior opening 190, the probe 104 continues to rotate and fluid continues to spray from the apertures 146a and 146b. With the nose 136 blocking the anterior opening 190, fluid accumulates within the body cavity 192 suspending tissue debris and contaminants therein, and fills toward the posterior opening 184. The rotating probe 104 and auger 122 act upon the accumulated volume of fluid causing the fluid to form a vortex that scours the walls of the body cavity 192 further loosening the tissue debris and contaminants. Further, the moving fluid lifts the leaf fat 194 away from the body cavity 192 enabling the fluid to clean tissue debris and condiments from between the leaf fat 194 and body cavity 192.

Figure 3:
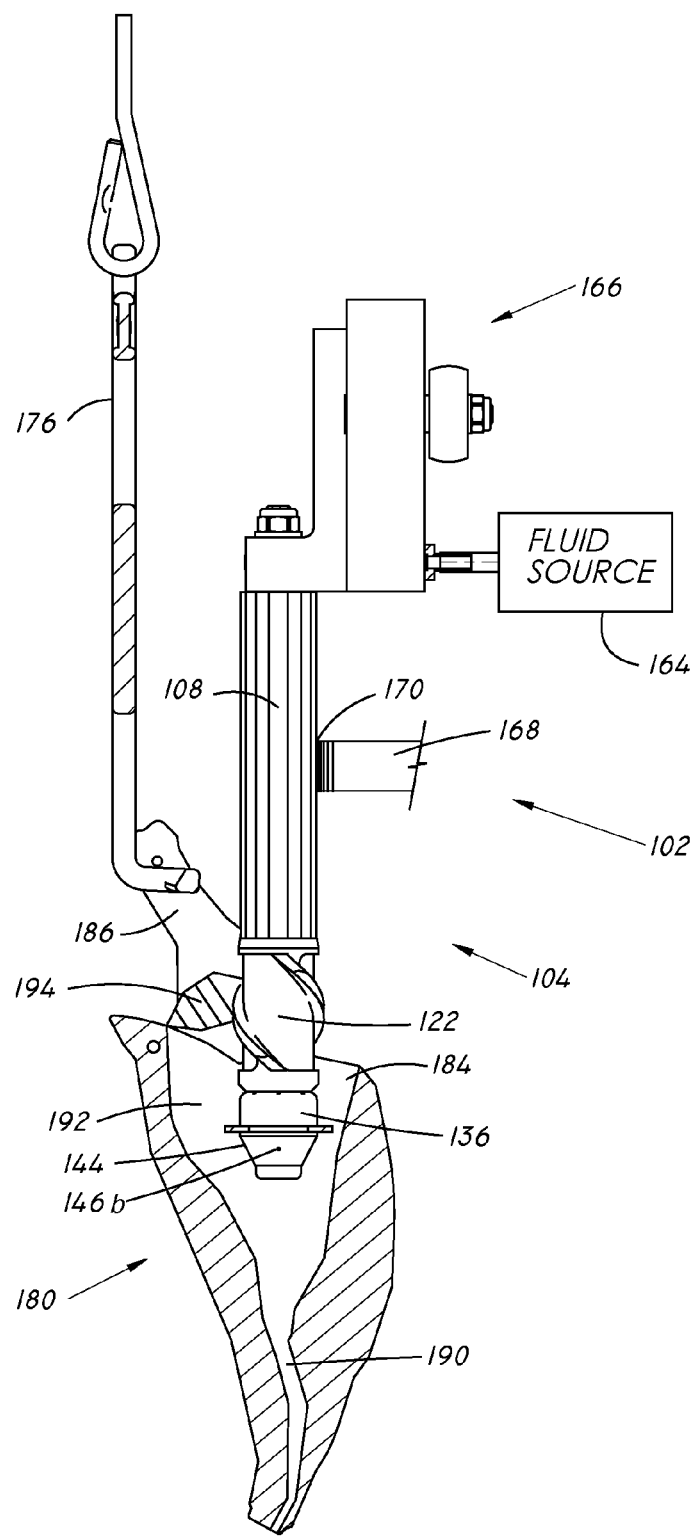
FIG. 3 is an elevation view of the bird cavity washer being withdrawn from the body cavity.

With the probe 104 in its lowermost position (FIG. 2), the nose 136 remains in the anterior opening 190 for a specified amount of time as the fluid sprays from the apertures 146a and 146b, and swirls within the body cavity 192. When the probe 104 begins its ascent from the body cavity 192, it continues to rotate and spray fluid. As the nose 136 is withdrawn from the anterior opening 190 fluid is again permitted to drain from the body cavity 192 through the anterior opening 190 evacuating the suspended tissue debris and contaminants. When the auger 122 encounters the leaf fat 194, the leaf fat 194 is displaced upward due to the rotation of the auger 122 allowing the fluid sprayed from the apertures 146a and 146b to further wash the area between the leaf fat 194 and the body cavity 192 (FIG. 3). After the probe 104 is withdrawn from the body cavity 192 the conveyor system moves the shackle 176 and bird carcass 180 to the next station in the process, and the probe 104 is repositioned for cleaning the body cavity 192 of another bird carcass 180.

An alternative method of using the bird cavity washer 102 is similar to above but when the probe 104 is inserted into the body cavity 192, the nose 136 does not obstruct the anterior opening 190.

In an alternative embodiment, the bird cavity washer 202 includes a probe 204 with a tubular spacer 222 instead of an auger. The probe 204 is inserted into the body cavity 192 so that the nose 136 obstructs the anterior opening 190 as above, and fluid is allowed to accumulate without agitation before it is evacuated through the anterior opening 190 thereby removing tissue debris and contaminants therefrom.

It will be appreciated that the components of the bird cavity washers 102 and 202 can be used for various other applications, and for processing other types of animals. Moreover, the bird cavity washers 102 and 202 can be fabricated in various sizes and from a wide range of suitable materials, using various manufacturing and fabrication techniques.

Although the invention has been disclosed with reference to various particular embodiments, it is understood that equivalents may be employed and substitutions made herein without departing from the scope of the invention as recited in the claims.

Having described the disclosed subject matter, what is claimed is:

1. A probe for cleaning the eviscerated body cavity of an animal carcass, comprising:
    a tube extending between an upper end and a lower end, the tube having an axial bore extending between the upper end and the lower end;
    an upper port at the tube upper end communicating with the tube bore and the exterior of the tube;
    a washer assembly rotatably mounted about the tube, comprising:
        a tubular nose portion extending between an upper end and a lower end, the lower end disposed proximal to the tube lower end, the nose having at least one aperture communicating between the interior and exterior of the nose;
        an outwardly open circumferential channel about the nose; and
        a resilient ring disposed within and extending from the channel;
    at least one port at the tube lower end communicating with the tube bore and the interior of the nose.

2. The probe of claim 1, wherein the at least one aperture includes a plurality of apertures in a spaced radial pattern projecting downward and away from the nose, and plurality of apertures in a spaced radial pattern projecting upward and away from the nose.

3. The probe of claim 1, wherein the washer assembly further comprises:
    a spacer having a tubular body rotatably mounted about the tube above the nose, wherein the spacer extends between an upper end and a lower end;
    a lower face at the tubular body lower end; and
    wherein the at least one aperture includes an upper port extending between the interior of the nose and the upper end of the nose.

4. The probe of claim 1, wherein the washer assembly further comprises:
    an auger having a tubular body rotatably mounted about the tube above the nose lower end wherein the auger extends between an upper end and a lower end; and
    a helical projection extending from the exterior surface of the auger, wherein the blade extends between the upper end and the lower end.

5. The probe of claim 4, wherein the washer assembly further comprises:
    a sleeve having a tubular body extending between an upper end and a lower end; and
    wherein the upper end of the auger operably engages the lower end of the sleeve.

6. The probe of claim 1, further comprising a fastener at the lower end of the tube for retaining the nose on the tube.

7. The probe of claim 1, further comprising a fluid source communicating with the upper port.

8. The probe of claim 1, further comprising a rotational energy source for providing rotational energy to the auger.

9. The probe of claim 1, wherein the washer assembly further comprises:
    a first lower port;
    a second lower port disposed below the first lower port; and
    a cavity formed within the inner surface of the nose and extending between the first and second lower ports.

10. A probe for cleaning the eviscerated body cavity of an animal carcass, comprising:
    a tube extending between an upper end and a lower end, the tube having an axial bore extending between the upper end and the lower end;
    an upper port at the tube upper end communicating with the tube bore and the exterior of the tube;
    a washer assembly rotatably mounted about the tube, comprising:
        a tubular nose portion extending between an upper end and a lower end, the lower end disposed proximal to the tube lower end, the nose having at least one aperture communicating between the interior and exterior of the nose;
        a tubular auger portion disposed above the nose lower end, the auger extending between an upper end and a lower end;
        a helical blade projecting from the auger extending between the auger lower end and the auger upper end;
        a sleeve having a tubular body extending between an upper end and a lower end; and
        wherein the upper end of the auger operably engages the lower end of the sleeve in an alternating slot and tooth arrangement; and
    a lower port at the tube lower end communicating between the tube axial bore and the nose aperture for expelling fluid from the nose.

11. The probe of claim 10, wherein the nose includes a plurality of apertures in a spaced radial pattern projecting downward and away from the nose, and a plurality of apertures in a spaced radial pattern projecting upward and away from the nose.

12. The probe of claim 11, further comprising:
    a lower annular groove disposed at the nose lower end;
    a seal disposed within the lower annular groove creating a sealing relationship between the nose and the tube;
    an upper annular groove disposed at the nose upper end; and
    a seal disposed within the upper annular groove crating a sealing relationship between the nose and the tube.

13. The probe of claim 10, further comprising:
    a notch within the sleeve lower end; and
    a bushing disposed within the notch creating a sealing relationship between the sleeve and the tube.

14. The probe of claim 10, wherein the upper end of the nose operably engages the lower end of the sleeve in an alternating slot and tooth arrangement.

15. The probe of claim 10, wherein the nose lower end further comprises:
    a sidewall tapering from a wide upper end to a narrow lower end; and
    wherein the at least one aperture in the nose communicates between the interior of the nose and the sidewall upper end.

* * * * *